United States Patent Office 2,960,524
Patented Nov. 15, 1960

2,960,524

MANUFACTURE OF ARYL PHOSPHATE ESTERS

Frederick S. Wilson, Nixon, N.J., assignor to Socony Mobil Oil Company, Inc., a corporation of New York No Drawing. Filed Jan. 6, 1958, Ser. No. 707,134

3 Claims. (Cl. 260—461)

This invention relates to the art of esterification. It is more particularly concerned with an improved process for making aryl phosphate esters.

As is well known in the art, aryl phosphate esters, such as tricresyl phosphate, cresyl diphenyl phosphate, and the like, have found utility as plasticizers for polyvinyl chloride plastics and as addition agents to gasoline. It has been proposed to produce these materials by the non-catalytic reaction between a phenolic compound, such as phenol, cresol, xylenol, etc., and phosphorus oxychloride ($POCl_3$), in a 3:1 molar ratio. The initial reaction is carried out at 90–100° C. Then, the temperature is gradually increased, at the rate of 5–10° C. per hour, to a temperature of 230° C. The increase of reaction temperature takes 12 to 24 hours and the total run time is of the order of 40 to 60 hours. It has also been proposed to carry out the process catalytically at "elevated" temperatures, a large number of catalysts being proposed. Insofar as is known, however, the prior art processes have involved long reaction times and/or relatively low yields of product.

It has now been found that aryl phosphate esters can be produced in yields of 95 percent or higher, using a relatively short total reaction time. It has been discovered that aryl phosphate esters can be produced in short periods of time and in high yields, when the reaction is carried out in the presence of a specific catalyst, magnesium chloride, and the heating cycle is controlled within a narrow range.

Accordingly, it is a broad object of the present invention to provide an improved method for making aryl phosphate esters. Another object is to provide an improved catalytic process for producing aryl phosphate esters. A specific object is to provide a method for preparing aryl phosphate esters in high yields with a relatively short reaction time. A more specific object is to provide a specific catalyst and heating cycle in the production of aryl phosphate esters. Other objects and advantages of this invention will become apparent to those skilled in the art, from the following detailed description.

In general, the present invention provides an improved method for reacting a phenolic compound reactant with phosphorus oxychloride to form a triaryl phosphate ester, wherein the reaction is carried out in the presence of catalytic amounts of magnesium chloride and the reaction is carried out initially at 100–125° C. for 1–3 hours and then up to 200° C., the entire reaction time not exceeding 6 hours; the reaction mixture is neutralized with sodium carbonate; and then the triaryl phosphate ester is separated by vacuum distillation.

The process of this invention involves the reaction between phosphorus oxychloride ($POCl_3$) and a phenolic reactant in a molar proportion of 1:3, respectively. In practice, a slight molar excess of phenolic reactant may be used (up to 10 percent molar excess), but the reaction involves only 3 moles of phenolic compound reactant per mole of phosphorus oxychloride reactant.

The phenolic compound reactant is a phenol or an alkyl-substituted phenol. Non-limiting examples of the phenolic compound reactant are phenol, cresols (o, m, or p or mixtures thereof), dimethyl phenols, ethyl phenol, 2-ethylhexyl phenol, and the like. It is contemplated to react a mixture of two or more phenolic compound reactants. Thus, for example, it is possible to use a mixture of about one mole cresol and two moles of phenol per mole of phosphorus oxychloride.

The specific catalyst for the process of this invention is magnesium chloride. Other catalysts are ineffective or otherwise disadvantageous, under the conditions of the present process. Thus, aluminum chloride is operable from the chemical standpoint, but has a practical disadvantage in that it causes the formation of solid intermediate products during the reaction. This presents stirring difficulties that are undesirable from the commercial standpoint. Magnesium chloride, on the other hand, is an effective catalyst and maintains a reaction mixture that is fluid throughout and, therefore, easily agitated. The amount of magnesium chloride used will vary between about 0.005 mole and about 0.05 mole per mole of phosphorus oxychloride used, and preferably between about 0.01 mole and about 0.02 mole.

The conditions of time and temperature in the heating cycle of the present process are critical. The reaction involved is a stepwise reaction, i.e., first one mole of phenolic compound reacts with the phosphorus oxychloride, then the second mole, followed by the third mole. The reaction commences at a temperature of about 90° C. In order to ensure a high yield of product, the process must be carried out in two distinct stages. In the first stage, heat is applied to the reaction mixture of phenolic compound reactant, phosphorus oxychloride, and magnesium chloride catalyst to start the reaction and the temperature is maintained at between about 100° C. and about 125° C. for between about one hour and about 3 hours. Then, the second stage is commenced. In this stage the reaction temperature is increased rapidly to about 200° C. The rate of temperature increase will be between about 0.5° C. and about 5° C. increase per minute and, preferably, between about 2° C. and about 3° C. increase per minute. In some cases, the reaction will be complete when the temperature reaches 200° C. This will be evidenced by cessation of the evolution of hydrogen chloride. If reaction is not complete at this point, the temperature is maintained at about 200° C. until completion is noted, usually for a few minutes to one hour. In any event, the total reaction time of both stages will be between about 4 hours and about 6 hours.

During the latter 0.5 hour to 1.5 hours of the second reaction stage, it has been found necessary to operate under reduced pressure. If this is not done, the yield will be relatively low. In practice, the pressure in the reactor is reduced as rapidly as possible down to a pressure of between about 100 and about 150 mm. of mercury.

When the reaction is complete, as aforedescribed, the reaction mixture is treated to remove residual acidity. This can be done while the reaction mixture is still hot, i.e, without cooling before treatment. A solid, weakly-basic salt is added to the reaction mixture and stirred for a few minutes. In practice, it is advantageous to reapply vacuum to the reactor to hasten neutralization. Sodium carbonate is the preferred neutralizing agent, but others can be used, e.g., sodium bicarbonate, ammonium carbonate, potassium carbonate, etc. The amount of neutralizer salt that is used will vary between about 0.1 percent and about 1.0 percent, by weight of total reactants.

The neutralized reaction mixture is then subjected to vacuum distillation. The excess phenolic compound reactant is removed as a fore-run. Then the product triaryl phosphate ester is removed at almost constant boiling temperature. For example, a preferred product, cresyl diphenyl phosphate, boils at 285–300° C. under a vacuum of 0–5 mm. By means of this process, the desired triaryl phosphate ester can be obtained in yields of 95 percent of theoretical and higher, up to about 98 percent.

The following example illustrates the process of this invention and demonstrates the effectiveness thereof. This invention is not to be limited to the specific reactants and manipulations set forth in the example. Other reactants and operations as set forth hereinbefore can be used, as those skilled in the art will readily appreciate.

*Example*

The phenolic compound reactant used in this run was a mixture comprising about 35 weight percent phenol and about 65 weight percent cresol, of which about 85 weight percent was o-cresol, the balance being m- and p-cresols with a trace of 2,6-xylenol. This mixture has a 5 percent distillation point of about 185° C., a 50 percent point of about 190–195, and a 95 percent point of about 200° C.

Into a reaction vessel were charged, 10 grams magnesium chloride catalyst, 1155 grams (7.5 moles) phosphorus oxychloride, and 2540 grams (24.75 moles including 10 percent molar excess) of the aforedefined phenolic compound reactant. Agitation was used throughout the reaction period. The reaction mixture was heated to 110° C. and held at that temperature for about 2 hours and 5 minutes. Then, heat input was increased and the temperature was gradually increased, over a period of 2 hours and 10 minutes, to 200° C. During the last 50 minutes of this heating period, pressure in the reactor was gradually reduced to 100–150 millimeters of mercury and held at that pressure until the temperature of 200° C. was reached.

After the temperature in the reactor had reached 200° C., the reaction was complete as evidenced by cessation of the evolution of hydrogen chloride gas. Then, the pressure was permitted to come back to atmospheric and heating was stopped. While the material in the reactor was still hot, 18.6 grams of solid sodium carbonate were added to neutralize residual hydrogen chloride. During the neutralization period, the mixture was stirred and the pressure was again reduced to 100–150 mm. for about 15 minutes.

The reaction mixture was transferred to a distillation vessel and excess phenolic compound reactant was distilled off. Then, the material boiling between 293° C. and 300° C. under 1–5 millimeters mercury pressure was distilled out as the product. The yield was 96.1 weight percent of theoretical. This product was a mixture of about 87 weight percent phenyl dicresyl phosphate and about 13 weight percent cresyl diphenyl phosphate. It had a refractive index (25° C.) of 1.5620 and a specific gravity (60/60° F.) of 1.207.

It will be appreciated that the process of this invention affords high yields of aryl phosphate esters. The entire operation is completed within 8 hours, an important economic consideration in commercial operations which are operated on an 8-hour shift basis.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. An improved process for producing phenolic phosphate esters, which comprises reacting in two stages, a phenolic compound reactant selected from the group consisting of phenol and lower alkylphenols with phosphorus oxychloride, in a molar ratio of at least 3:1, respectively, and in the presence of catalytic amounts of magnesium chloride; in the first stage, heating the reaction mixture at a temperature of between about 100° C. and about 125° C. for between about one hour and about 3 hours; in the second stage, increasing the reaction temperature of the first stage to about 200° C. at a rate of between about 0.5° C. per minute and about 5° C. per minute, the total reaction time in both stages being between about 4 hours and about 6 hours, and operating under reduced pressure during the latter 0.5 hour to 1.5 hours of the reaction time; neutralizing the reaction mixture with a solid, weakly basic inorganic salt; and separating said phenolic phosphate ester.

2. An improved process for producing phenolic phosphate esters, which comprises reacting, in two stages, a phenolic compound reactant selected from the group consisting of phenol and lower alkylphenols with phosphorus oxychloride, in a molar ratio of at least 3:1, respectively, and in the presence of between about 0.005 mole and about 0.05 mole of magnesium chloride per mole of said phosphorus oxychloride; in the first stage, heating the reaction mixture at a temperature of between about 100° C. and about 125° C. for between about one hour and about 3 hours; in the second stage, increasing the reaction temperature of the first stage to about 200° C. at a rate of between about 0.5° C. per minute and about 5° C. per minute, the total reaction time in both stages being between about 4 hours and about 6 hours, and operating under reduced pressure during the latter 0.5 hour to 1.5 hours of the reaction time; neutralizing the reaction mixture with solid sodium carbonate; and separating said phenolic phosphate ester by vacuum distillation methods.

3. An improved process for producing a mixture of dicresyl phenyl phosphate and diphenyl cresyl phosphate, which comprises reacting, in two stages, a mixture of phenol and cresol with phosphorus oxychloride, in a molar ratio of at least 3:1, respectively, and in the presence of between about 0.005 mole and about 0.05 mole of magnesium chloride per mole of said phosphorus oxychloride; in the first stage, heating the reaction mixture at a temperature of between about 100° C. and about 125° C. for between about one hour and about 3 hours; in the second stage, increasing the reaction temperature of the first stage to about 200° C. at a rate of between about 0.5° C. per minute to about 5° C. per minute, the total reaction time in both stages being between about 4 hours and about 6 hours, and operating under reduced pressure during the latter 0.5 hour to 1.5 hours of the reaction time; neutralizing the reaction mixture with solid sodium carbonate; and separating by vacuum distillation a mixture of dicresyl phenyl phosphate and cresyl diphenyl phosphate.

References Cited in the file of this patent

UNITED STATES PATENTS

| | | |
|---|---|---|
| 1,840,335 | Horst | Jan. 12, 1932 |
| 2,078,421 | Shuman | Apr. 27, 1937 |
| 2,561,493 | Caprio et al. | July 24, 1951 |
| 2,573,658 | Weesner | Oct. 3, 1951 |
| 2,870,192 | Bonstedt | Jan. 30, 1959 |